May 15, 1956     M. F. CHUBB ET AL     2,745,893
CUPROUS CHLORIDE MAGNESIUM CELL WITH CELLOPHANE MEMBRANE
Filed April 23, 1952

- CUPROUS CHLORIDE
- SCREEN OR GRID
- BIBULOUS PAD
- CELLULOSE MEMBRANE
- BIBULOUS MATERIAL
- MAGNESIUM

INVENTORS
Melvin F. Chubb &
BY James M. Dines
Wood, Herron & Evans.
ATTORNEYS.

United States Patent Office 2,745,893
Patented May 15, 1956

2,745,893

CUPROUS CHLORIDE MAGNESIUM CELL WITH CELLOPHANE MEMBRANE

Melvin F. Chubb and James M. Dines, Joplin, Mo., assignors to The Eagle-Picher Company, Cincinnati, Ohio, a corporation of Ohio Application April 23, 1952, Serial No. 283,938

2 Claims. (Cl. 136—100)

This invention relates to cuprous chloride magnesium cells in which water or an aqueous solution is used as the electrolyte and in which a pad of bibulous material is employed for retaining the electrolyte in engagement with the electrodes of the cell. The invention is particularly applicable to a cell in which the positive electrode is constituted by a mass of pulverant cuprous chloride pasted to a screen or grid. This type of cell is activated with electrolyte just prior to time of use and is adapted to discharge a useful current for a period of substantially four to six hours after activation. In general, it is necessary to activate the cell anywhere from a few minutes to half an hour prior to actual use in order to permit a build up of magnesium salt in the electrolyte and the action of the electrolyte disintegrates the pasted positive physically regardless of whether the circuit is closed or not.

After the cell or battery has been activated by aqueous electrolyte and circuit closed, an electrochemical process involving the material of the positive electrode commences, so that the positive electrode is disintegrated by both physical and electrochemical forces. The use of a limited quantity of electrolyte, which is immobilized by the bibulous pad which carries it, has the advantage of minimizing the rate of physical disintegration of the positive electrode without impairing the electrolytic action. But the disadvantage of this arrangement is that various copper compounds become deposited within the fiber structure of the bibulous pad and tend to short circuit the cell. These deposits or filaments of copper compounds start to form from the magnesium electrode side of the cell and, while not pure copper, seem to have enough current carrying capacity to impair the output of the cell through the external circuit. If the deposits build up to a true short circuit, then the remainder of the chemicals which constitute the electrodes is exhausted by electrochemical action without any useful result in the external circuit. This forming of short circuits is most apt to occur during the latter half of the period of discharge of a cuprous chloride magnesium cell.

The object of the present invention is to provide a cell of the type described which delivers useful current until one or both of the materials of the electrodes are exhausted.

We have discovered and determined that this result is attained by disposing a relatively dense membrane such as regenerated viscose, i. e., cellophane, between the two electrodes preferably intermediate the layers of the bibulous pad which holds the electrolyte. The reason for the efficacy of this relatively simple expedient is not easily explained, but the benefit and value has been determined empirically.

From the point of view of theory, cuprous chloride is relatively insoluble in water, whereas cupric chloride is relatively soluble. In the presence of water, cuprous chloride tends to convert to cupric chloride and copper or to complex copper salts and hydrates. Since the cell of the type in question produces a current which is relatively large in relation to the weight of the materials which constitute the electrodes, it must be assumed that the cuprous chloride of the positive electrode is dissolved in the electrolyte to a degree substantially greater than it would be if it remained as cuprous chloride. The cuprous chloride magnesium cells which utilize porous or pasted positive electrodes generate substantial heat in operation, and this heat accelerates the conversion and disintegration of the positive electrode.

In any event, magnesium chloride is formed at the negative electrode after the circuit is closed and, in theory, all of the copper should wind up at the positive electrode, or otherwise expressed, the cuprous chloride of the positive electrode should be reduced to metallic copper. In practice, however, the reactions do not correspond to any simple theory and copper compounds are deposited in the bibulous pad between the positive and negative electrodes. In some cases, the copper seems to foul up the magnesium negative electrode and in other cases the copper compound seems to plate out in filaments through the bibulous pad, thereby tending to produce short circuiting during the latter part of the life of the cell. In fact, a cell may go dead on this account before the useful life of the chemicals which constitute the electrode is exhausted.

Irrespective of the explanation of the cell failure, we have determined that a membrance of cellophane disposed between the layers of the bibulous pad prevents the failure of the cell through the deposits of copper compound prior to the exhaustion of the active chemicals. When the cellophane is employed, the copper or copper compound tends to plate out in between the membrane and the negative electrode. This plating out not only does not interfere with the operation of the cell but locates the zone of plating out in a manner which prolongs the useful life of the cell over what it would be if the cellophane were not used. In place of the cellophane, any membrane of substantially equal porosity may be employed. The interposing of such a membrane between the electrodes does not materially lessen the efficiency of the battery during the earlier part of its discharge, but does improve and maintain the efficiency of the discharge for the longer period, i. e., the life of the active chemicals of the electrodes.

Other objects and further advantages will be disclosed in relation to the descriptions of the accompanying drawings in which.

Figure 1:
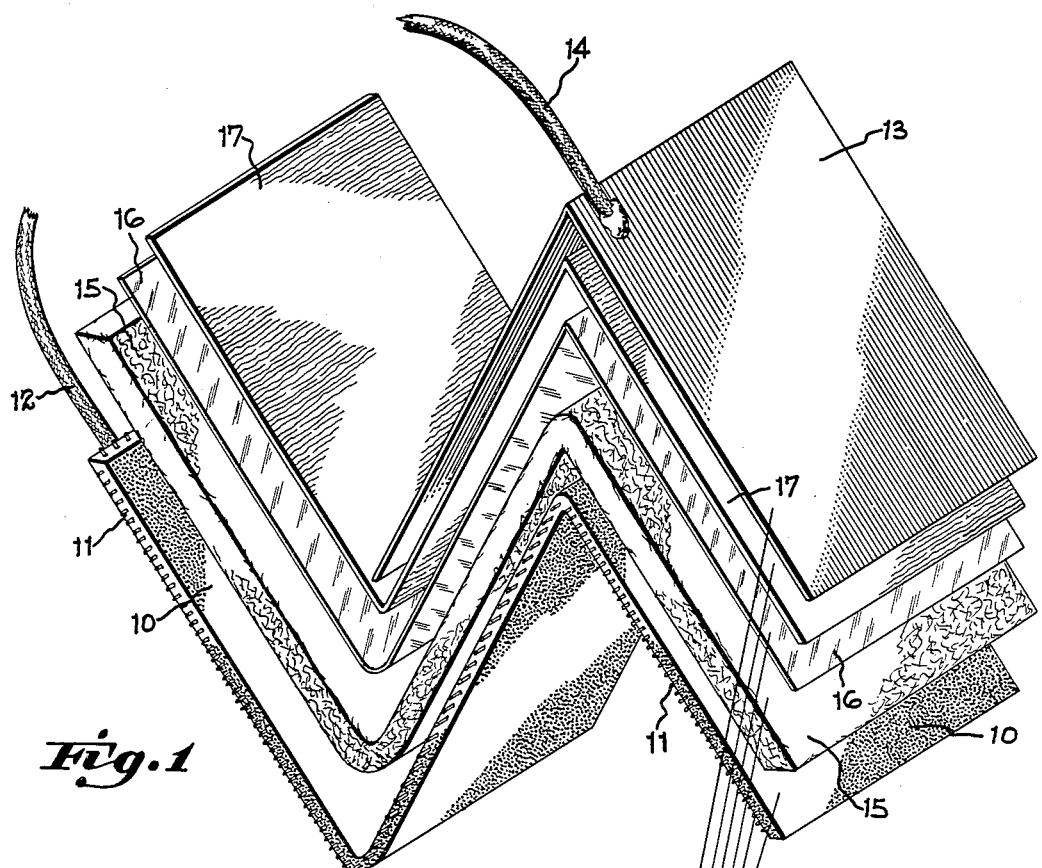
Figure 1 is an exploded perspective view of an electrode assembly.

In the drawings, the positive electrode is constituted by a mass of cuprous chloride 10 which is pasted on a screen or grid 11 to which is attached connecting wire 12. The negative electrode is a sheet of magnesium 13 to which is connected a wire 14. In between said two electrodes, is a laminated electrode separating assembly which is constituted by a relatively thick bibulous pad 15, a layer of cellophane or a similar regenerated cellulose membrane 16, and a layer of bibulous material 17 which may be similar in nature to bibulous pad 15 or may be of somewhat denser material which is still porous and bibulous. As disclosed, the electrodes and the separator materials are fan folded to constitute assemblies of substantial surface area, although the fan folding is not necessary or a part of this invention.

Figure 2:
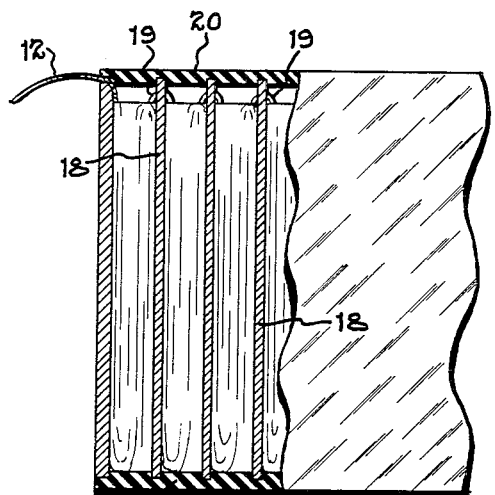
Figure 2 is a partially sectional view taken through a portion of a battery utilizing the electrode of Figure 1.

As disclosed in Figure 2, the electrode assemblies of Figure 1 are disposed in individual cell compartments constituted by plastic sheeting 18 and the electrodes of the individual cells are connected in series by connectors 19. The plastic sheets are held together by plastic material 20. The exact structure of the battery in which the cells are used has no relationship to the subject matter of the present invention, so the disclosures of the drawings are only by way of example.

The critical and important aspect of this invention is the use of the cellulosic membrane, exemplified by cellophane in combination with an electrolytic cell which is constituted by a pasted cuprous chloride positive electrode, a magnesium negative electrode and a bibulous pad for holding the electrolyte in engagement with each. The membrane performs the function of disposing the deposition of copper compounds between the two electrodes in a manner which permits the cell to operate efficiently until the active chemicals of one or the other electrode of the cell is exhausted.

Having described our invention, we claim:

1. An electrolytic cell comprising a pasted cuprous chloride positive electrode, a magnesium negative electrode, at least two bibulous pads adapted to retain aqueous electrolyte, said pads disposed between said electrodes with one of said pads being in engagement with the positive electrode and with the other pad being in engagement with the negative electrode, and a membrane which is substantially thin in relation to said pads and of a porosity substantially equal to the porosity of regenerated cellulose, said membrane being sandwiched between said pads, whereby the membrane inhibits migration of copper deposits from the negative electrode to the positive electrode.

2. An electrolytic cell comprising a pasted cuprous chloride positive electrode, a magnesium negative electrode, at least two bibulous pads adapted to retain aqueous electrolyte, said pads disposed between said electrodes with one of said pads being in engagement with the positive electrode and with the other pad being in engagement with the negative electrode, and a cellophane membrane sandwiched between said pads, whereby the membrane inhibits migration of copper deposits from the negative electrode to the positive electrode.

References Cited in the file of this patent

UNITED STATES PATENTS

| Number | Name | Date |
| --- | --- | --- |
| Re. 23,427 | Ruben | Oct. 30, 1951 |
| 2,199,445 | Ruben | May 7, 1940 |
| 2,322,210 | Adams | June 22, 1943 |
| 2,428,850 | Lawson | Oct. 14, 1947 |
| 2,536,696 | Ruben | Jan. 2, 1951 |
| 2,542,710 | Ruben | Feb. 20, 1951 |
| 2,594,710 | Andre | Apr. 29, 1952 |
| 2,594,711 | Andre | Apr. 29, 1952 |
| 2,607,809 | Pitzer | Aug. 19, 1952 |
| 2,636,060 | Fischbach et al. | Apr. 21, 1953 |
| 2,639,306 | Fischbach | May 19, 1953 |
| 2,640,863 | Ellis | June 2, 1953 |